United States Patent [19]

Nakajima et al.

[11] Patent Number: 4,825,137

[45] Date of Patent: Apr. 25, 1989

[54] TIME BASE CONTROL SYSTEM FOR A SPINDLE SERVO

[75] Inventors: Masahiro Nakajima; Tutomu Banno, both of Saitama, Japan

[73] Assignee: Pioneer Electronic Corporation, Tokyo, Japan

[21] Appl. No.: 121,248

[22] Filed: Nov. 16, 1987

[30] Foreign Application Priority Data

Nov. 14, 1986 [JP] Japan .................................. 61-271293

[51] Int. Cl.⁴ .............................................. G05B 11/18
[52] U.S. Cl. .................................. 318/594; 318/317; 318/619; 360/78.14; 360/73.03; 369/44
[58] Field of Search ........ 318/590, 591, 592, 593–595, 318/561, 619–624, 615–618, 309–318; 360/77–78; 369/43, 44

[56] References Cited

U.S. PATENT DOCUMENTS

| | | | |
|---|---|---|---|
| 3,924,268 | 12/1975 | McIntosh et al. | 360/78 |
| 3,983,467 | 4/1976 | Bossons et al. | 318/593 |
| 4,106,058 | 8/1978 | Romegs et al. | 360/78 |
| 4,310,914 | 1/1982 | Riddle | 369/43 |
| 4,562,562 | 12/1985 | Moriya et al. | 318/593 |
| 4,614,986 | 9/1986 | LaBuddle | 318/593 |

*Primary Examiner*—William M. Shoop, Jr.
*Assistant Examiner*—David Martin
*Attorney, Agent, or Firm*—Sughrue, Mion, Zinn, Macpeak & Seas

[57] ABSTRACT

A time base control system for a spindle servo motor in which the time base is both coarsely controlled and finely controlled. According to the invention, when the recording head is alternately tracking and jumping tracks, the controllable range of the fine tuning is widened and the course tuning is gradually increased.

6 Claims, 5 Drawing Sheets

FIG. 3(A)
FIG. 3(B) DR ERROR CUT OFF
FIG. 3(C) DR ERROR CUT ON SHORT
FIG. 3(D) DR ERROR CUT ON LONG
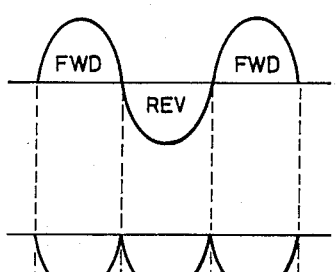
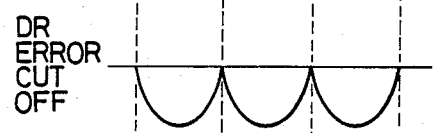
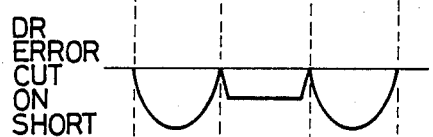
FIG. 4
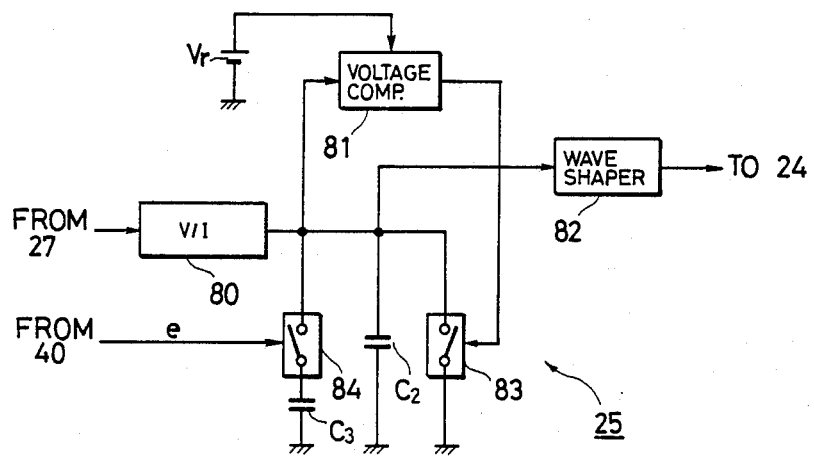

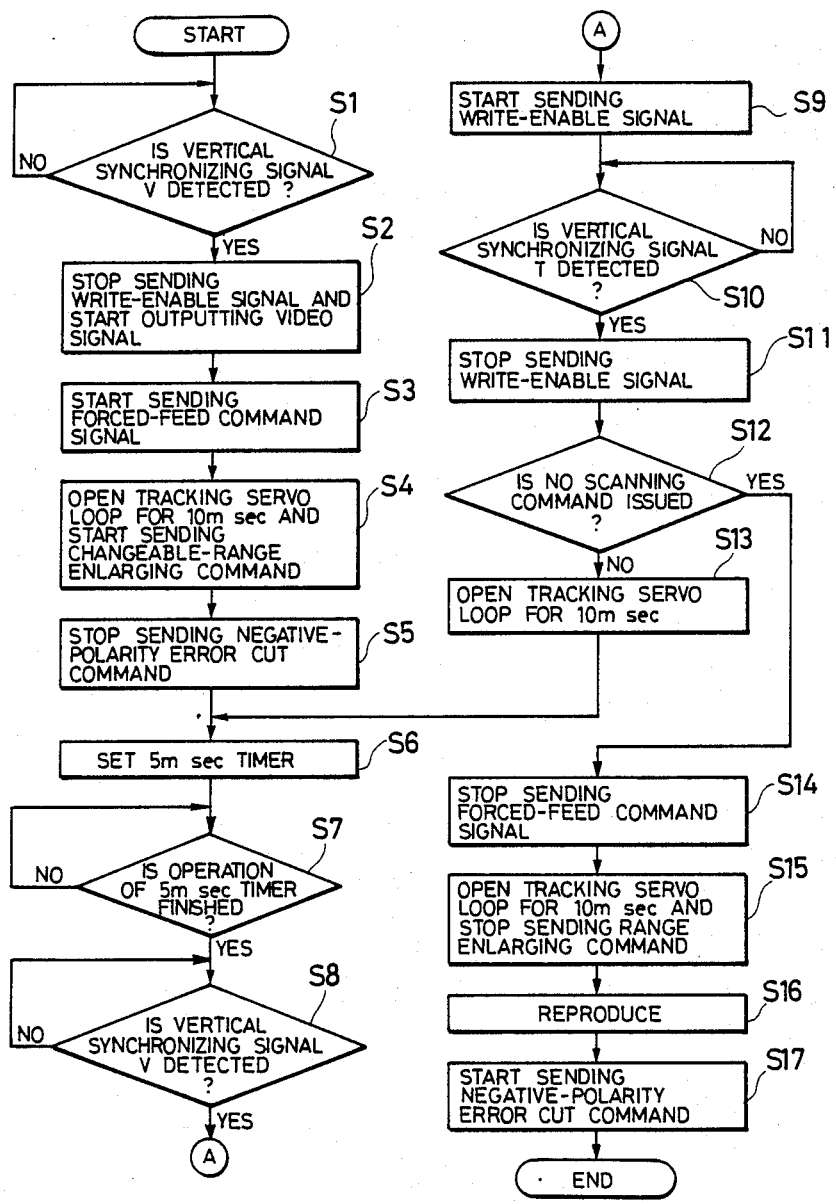

TIME BASE CONTROL SYSTEM FOR A SPINDLE SERVO

BACKGROUND

1. Field of the Invention

The present invention relates to a time base control system in the case where information, such as a video signal an audio signal or the like, is recorded onto or reproduced from a recording medium, such as a disk, a magnetic tape or the like.

2. Background of the Art

For example, one type of time base control systems employed in video disk players has the double function of rough tuning and fine tuning of a time base. The rough tuning is made by controlling the rotational speed of a spindle motor for rotationally driving a recording disk so as to control the relative speed between the recording disk and an information-detection point of a pickup acting as a signal recording/reproducing means. The fine tuning of the time base is made by feeding the reproduced signal obtained by the pickup to a variable delay device such as a CCD (charge coupled device).

In order to reduce the generation of heat and the consumption of electric power of the spindle motor in this type of video disk player, there has been proposed a technique in which the rotation control is made only by a forward driving signal during the time of play or still-reproduction where the revolution speed need not be rapidly changed. On the other hand the rotation control is made by both forward and reverse driving signals during the time of scanning or search where the revolution speed must be rapidly changed.

In such an arrangement, however, the loop gain of the spindle servo for controlling the revolution speed of the spindle motor at the start of scanning or searching is changed so rapidly that the revolution speed of the spindle motor is instantaneously disturbed to permit the disturbance to enter into a CCD loop provided for fine tuning of the time base. Consequently, the problem in the prior art is in that the time base error exceeds the changeable range of signal delay time of the CCD to produce chromatic disorder.

SUMMARY OF THE INVENTION

It is, therefore, an object of the present invention to provide a time base control system in which the above-mentioned disadvantages, such as chromatic disorder and the like, can be prevented, and in which heat production and electric power consumption can be reduced.

The time base error control system according to the present invention concerns jump control of the signal recording/reproducing means in which control for making the detection point trace a track formed on the recording medium and control for making the detection point jump over the tracks are alternately repeated. The present invention is characterized in that a controllable range of the means performing the fine tuning is widened and the supply of components of the error signal under a predetermined level to the means performing the rough tuning is gradually started so that the rough tuning is carried out by all the components of the error signal.

BRIEF DESCRIPTION OF THE DRAWINGS

FIGS. 3(A) through 3(D) are a waveform diagram showing the operation of the circuit of FIG. 2.

FIG. 4 is a circuit block diagram showing an example of the VCO 25 in the apparatus of FIG. 1.

FIG. 5 is a flowchart showing the operation of the apparatus of FIG. 1.

DETAILED DESCRIPTION OF THE EMBODIMENT

An embodiment of the present invention will be described in detail with reference to the accompanying drawings.

Figure 1:
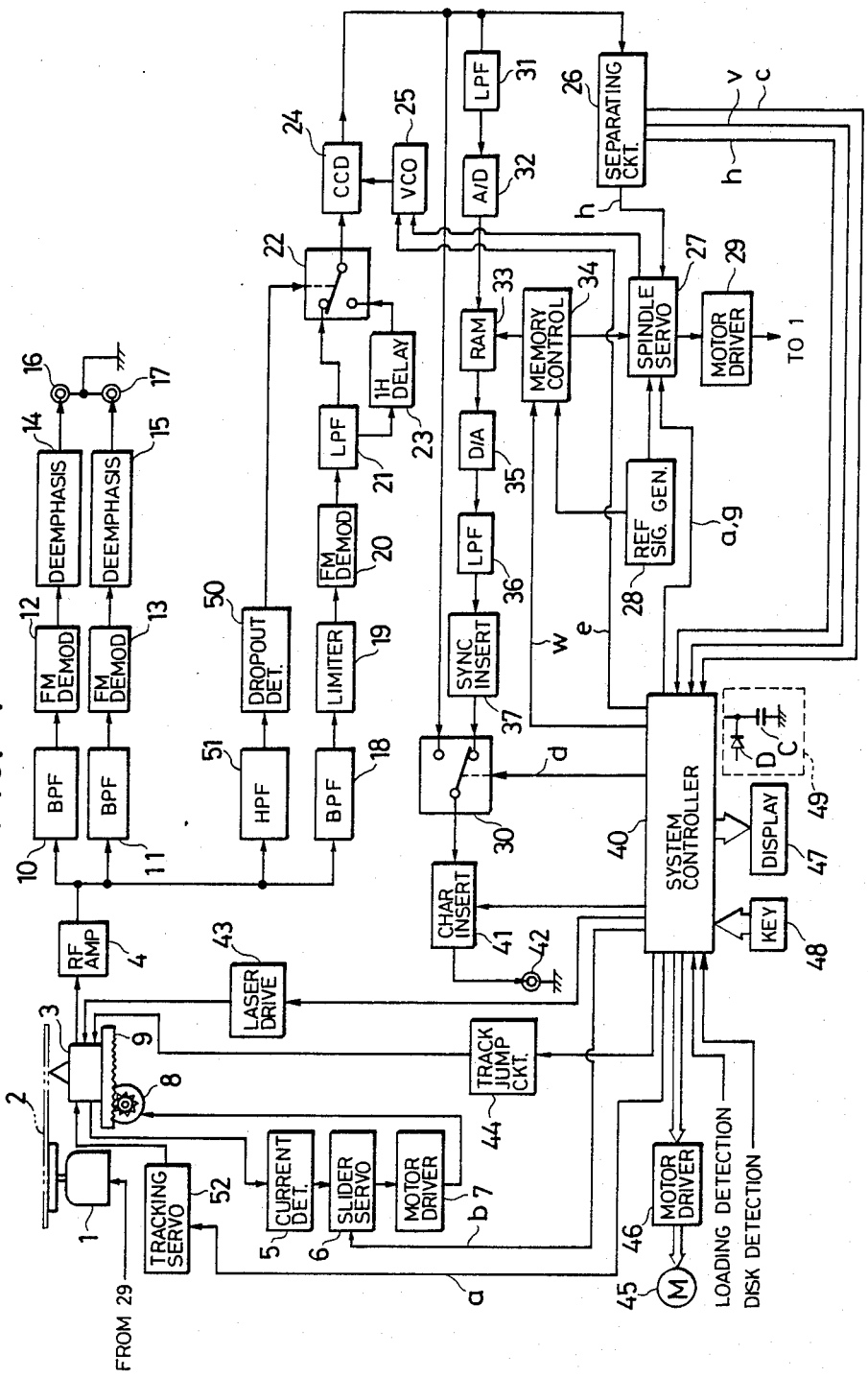
FIG. 1 is a block diagram showing a video disk player in which time base control is made by the system according to the present invention.

In FIG. 1, information recorded on a disk 2 rotationally driven by a spindle motor 1 is read through an optical pickup 3. In the pickup 3, a laser diode, an objective lens, a focus actuator, a tracking actuator, a photodetector, and so on, are incorporated. The output of the pickup 3 is fed to an RF amplifier 4 and, at the same time, is fed to a focus servo circuit (not shown) and a tracking servo circuit 52. The focus servo circuit operates the focus actuator in the pickup 3 so that laser light emitted from the laser diode in the pickup 3 is converged on the recording surface of the disk 2 to form an information-detection light spot (information detection point). The tracking servo circuit operates the tracking actuator so that positioning control for the light spot is performed in the radial direction of the disk 2 to place the light spot on a track formed on the recording surface of the disk 2. The tracking servo circuit 52 is arranged to open the tracking servo loop in response to the tracking open command signal a to thereby interrupt the position control for the information-detection light spot.

A coil current supplied to a coil for operating the tracking actuator in the pickup 3 is fed to a current detecting circuit 5. A current-detection signal corresponding to the coil current is generated from the current detecting circuit 5 and FET to a slider servo circuit 6. The slider servo circuit 6 amplifies and phase compensates the current-detection signal. The output of the slider servo circuit 6 forms a signal for driving a slider motor 8 after passing through a motor driving circuit 7. A slider 9 carrying the pickup 3 and movable in the radial direction of the disk is operated by the slider motor 8 so that the tracking actuator in the pickup 3 is controlled to be placed at a middle point of the movable range. The slider servo circuit 6 is arranged to forcibly move the slider 9 in the radial direction of the disk 2 by the forced-feed command signal b.

On the other hand, the RF signal from the RF amplifier 4 is fed to BPFs (band-pass filters) 10 and 11 so that two-channel signals that is, left-channel and right-channel audio FM signals, are extracted and separated. The two-channel audio FM signals are respectively fed to FM demodulators 12 and 13 so that two-channel audio signals are reproduced. The two-channel audio signals are fed to deemphasis circuits 14 and 15 so that components emphasized at the time of recording are returned to their original levels. The audio signals from the deemphasis circuits 14 and 15 are fed to audio output terminals 16 and 17.

The RF signal from the RF amplifier 4 is also fed to another BPF 18 so that a video FM signal is extracted and separated. After being amplitude limited by a limiter 19, the video FM signal is fed to an FM demodulator 20 so that a video signal is reproduced. The video signal is fed to one input terminal of a dropout-compensation changeover switch 22 after passing through an LPF (low-pass filter) 21. A video signal delayed by a 1H (one horizontal synchronizing period) delay line 23 is fed to the other input terminal of the changeover switch 22. A dropout-detection signal is generated from a dropout detecting circuit 50 and is fed as a control signal to the changeover switch 22. High-pass components of the RF signal, which are extracted and separated through an HPF (high-pass filter) 51, are fed to the dropout detecting circuit 50. The dropout detecting circuit 50 is arranged to detect dropouts, for example, by reference to the zero-cross points of the high-pass components of the RF signal to thereby generate a dropout-detection signal.

The signal-changeover operation of the changeover switch 22 is controlled by the dropout-detection signal so that, when a dropout occurs, the 1H-delayed video signal from the 1H delay line 23 is selected by the changeover switch 22 to compensate for the dropout.

The video signal selected by the changeover switch 22 is fed to a CCD (charge coupled device) 24. A clock signal generated from a VCO (voltage-controlled oscillator) 25 is fed to the CCD 24. The VCO 25 is arranged to have its free-running frequency reduced in response to the movable range enlarging command signal e. In the CCD 24, the video signal is delayed by the time inversely corresponding to the frequency of the clock generated from the VCO 25. The video signal from the CCD 24 is fed to a separating circuit 26. The separating circuit 26 is arranged to separate from the video signal a horizontal synchronizing signal h, a vertical synchronizing signal v and control data such as Philip codes and the like. The horizontal synchronizing signal h separated by the separating circuit 26 is fed also to a spindle servo circuit 27. The tracking open command signal and negative-polarity error cut command signal g from a system controller 40, which will be described later, are additionally fed to the spindle servo circuit 27. In the spindle servo circuit 27, the phase of the horizontal synchronizing signal h is compared with that of a reference synchronizing signal obtained by frequency division of a predetermined frequency reference signal $f_r$ generated from a reference signal generating circuit 28 so that a time base error signal is generated corresponding to the phase difference between the two signals. The output of the spindle servo circuit 27 is fed to a motor drive circuit 29 so that the rotational speed of the spindle motor 1 is controlled. The spindle motor 1, the pickup 3, the RF amplifier 4, the BPF 18, the limiter 19, the demodulator 20, the LPF 21, changeover switch 22, the 1H delay line 23, the CCD 24, the VCO 25 the separating circuit 26, the spindle servo circuit 27 and the motor drive circuit 29 constitute a spindle servo loop by which rough tuning of the time base is performed.

At the same time, the time base error signal generated from the spindle servo circuit 27 is fed to a control input terminal of the VCO 25. As a result, the oscillation frequency of the VCO 25 is adjusted corresponding to the phase difference between the horizontal synchronizing signal h and the reference synchronizing signal $f_r$ so that the signal delay time of the CCD 24 changes according to this phase difference to thereby remove the time base error. The CCD 24, the separating circuit 26, the spindle servo circuit 27 and the VCO 25 constitute a CCD servo loop by which fine tuning of the time base is carried out.

The video signal after removal of the time base error by the CCD 24 is fed to one input terminal of a changeover switch 30 and, at the same time, is fed to an A/D (analog-to-digital) converter 32 through an LPF 31. In the A/D converter 32, the video signal is sampled at a predetermined period and then the thus obtained sample values are successively converted into digital data. The output data from the A/D converter 32 are fed to a RAM 33 as a video memory. Address control and mode control of the RAM 33 are performed by a memory control circuit 34. The memory control circuit 34 is arranged to control the RAM 33 so that data written in the respective addresses of the RAM 33 can be successively read according to the clock signal fed from the reference signal generating circuit 28 and so that data in the respective addresses of the RAM 33 can be rewritten according to write-enable signal w from the system controller 40. The data read out of the RAM 33 are fed to a D/A converter 35 so as to be converted into an analog signal. The output of the D/A converter 35 is fed through an LPF 36 to a synchronizing-signal inserting circuit 37 by which a synchronizing signal is added so that a video signal is reproduced. The video signal from the synchronizing-signal inserting circuit 37 is fed to the other input terminal of the changeover switch 30. A control signal d for control of the changeover is fed to the changeover switch 30 from the system controller 40. A selected one of the video signal passed through the RAM 33 to the changeover switch 30 and the video signal fed from the CCD 24 directly to the changeover switch 30 is fed to a character inserting circuit 41. The character inserting circuit 41 is arranged to mix the video signal which corresponds to the character indicated by the data sent from the system controller 40 with the video signal fed from the changeover switch 30. The video signal from the character inserting circuit 41 is fed to a video output terminal 42.

The system controller 40 is made up of a microcomputer which includes a processor, a ROM, a RAM. a programmable timer and other parts. The system controller 40 receives, a synchronizing signal and control data from the separating circuit 26: data according to the key operation of an operation key 48; a loading detection signal from the loading mechanism: a disk detection signal: and the like. In the system controller 40, the processor processes inputted signals based on the program which has been stored in the ROM to thereby control the respective parts, that is, the slider servo circuit 6 the VCO 25 the spindle servo circuit 27, the changeover switch 30, the memory control circuit 34 the character inserting circuit 41, the laser diode driving circuit 43 the tracking jump operating circuit 44 for operating the tracking actuator in response to the jump command the motor drive circuit 46 for driving the motor 45 of the disk loading mechanism, a display circuit 47, the tracking servo circuit 52, and the like. An electric source $V_{cc}$ is supplied to an electric-supply terminal of the system controller 40 through a diode D. A capacitor C is connected between the electric-source terminal of the system controller 40 and ground. The diode D and the capacitor C constitute a backup circuit 49 so that the electric source can be supplied to the system controller 40 even in the case where the electric source is momentarily turned off.

Figure 2:
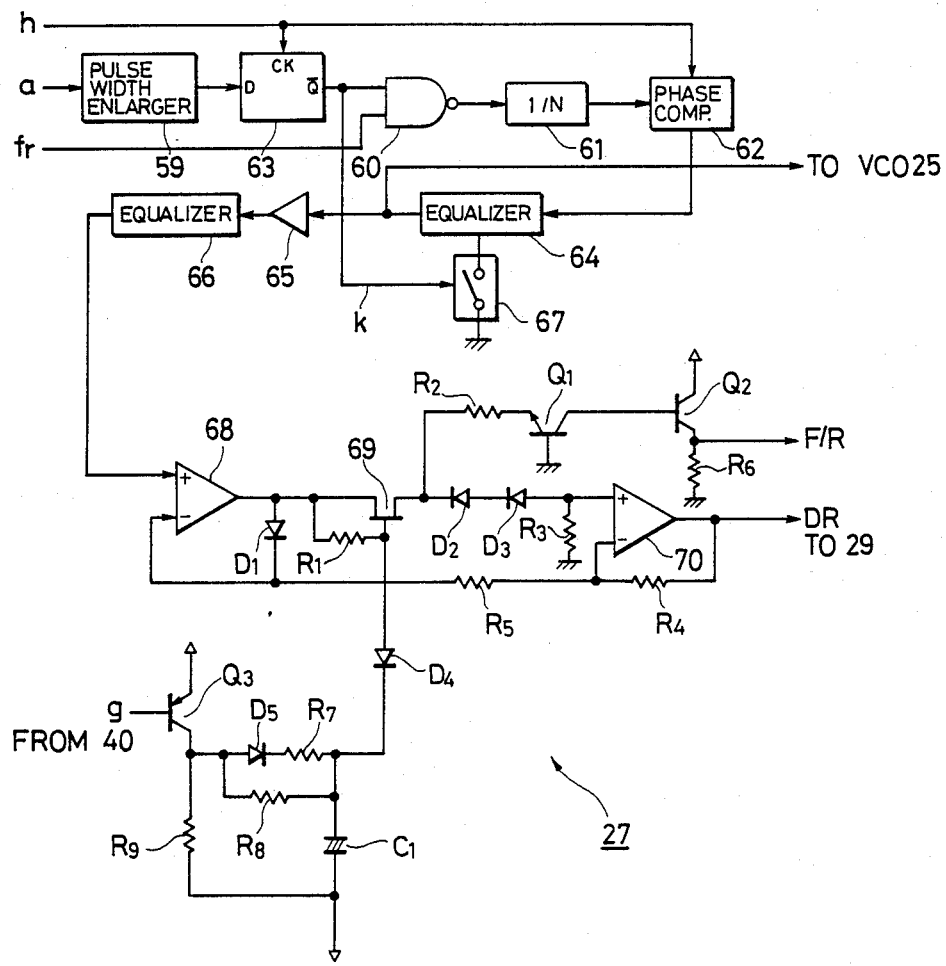
FIG. 2 is a circuit block diagram showing a specific example of the spindle servo circuit 27 in the apparatus of FIG. 1.

FIG. 2 is a diagram showing a specific example of the spindle servo circuit 27. In the drawing the reference signal $f_r$ from the reference signal generating circuit 28 is fed to one input terminal of a NAND gate 60 so that the reference signal $f_r$ after passing through the NAND gate 60 is fed to an N-ary counter 61 as an N-ary frequency dividing circuit. The reference signal $f_r$ of divided frequency of 1/N. as a reference synchronizing signal is fed from the most-significant-position output terminal of the N-ary counter 61 to a phase comparison circuit 62. Accordingly, the reference signal $f_r$ is fed to the N-ary counter 61 and the reference synchronizing signal is fed to the phase comparison circuit 62 as long as the other input terminal of the NAND gate 60 is supplied with the signal of logic "1". The $-Q$ output of a D-type flip-flop circuit 63 is fed to the other input terminal of the NAND gate 60. The output of a pulse width enlarging circuit 59 is made up of a monostable multivibrator which is triggered by the tracking open command signal The horizontal synchronizing signal h from the separating circuit 26 is fed to the clock input terminal of the D-type flip-flop circuit 63.

Accordingly, when supplied with the tracking open command a, the D-type flip-flop circuit 63 is put in its set state so that the reference signal $f_r$ cannot be fed to the N-ary counter 61.

In the phase comparison circuit 62, a signal is generated corresponding to the phase difference between the reference synchronizing signal from the counter 61 and the horizontal synchronizing signal h and this signal is output as a time base error signal. The output of the phase comparison circuit 62 is fed to the non-inverting input terminal of an operational amplifier 68 through equalizers 64 and 66 and an amplifier 65. A switch 67 connected to the equalizer 64 discharges electric charge accumulated in a time constant circuit determining the frequency characteristic. The opening and closing of the switch 67 is controlled by the $-Q$ output of the D-type flip-flop circuit 63, which is output as a time base servo open command signal k. The output of the equalizer 64 is fed to the VCO 25 as a control signal.

The output of the operational amplifier 68 is applied to the anode of a diode $D_1$ and, at the same time, is fed to the source of an FET (field-effect transistor) switch 69. The cathode of the diode $D_1$ is connected to the inverting input terminal of the operational amplifier 68. A resistor $R_1$ is connected between the gate and source of the FET switch 69. The signal passed to the drain of the FET switch 69 is fed to the emitter of a base-grounded transistor $Q_1$ through a resistor $R_2$ and, at the same time, is applied to the cathode of a diode $D_2$. The cathode of a diode $D_3$ is connected to the anode of the diode $D_2$. The anode of the diode $D_3$ is connected to the non-inverting input terminal of an operational amplifier 70. A resistor $R_3$ is connected between the non-inverting terminal of the operational amplifier 70 and ground. A feedback resistor $R_4$ is connected between the output terminal and the inverting input terminal of the operational amplifier 70. A resistor $R_5$ is connected between the inverting input terminal of the operational amplifier 70 and the inverting input terminal of the operational amplifier 68.

The collector output of the transistor $Q_1$ is output as an F/R signal for showing the polarity of the time base error signal, through a buffer amplifier which is composed of a transistor $Q_2$ and a resistor $R_6$. The output of the operational amplifier 70, as a driving signal DR. is fed to the motor drive circuit 29.

A charge voltage of a capacitor $C_1$ is applied to the gate of the FET switch 69 through a diode $D_4$. A negative source voltage is applied to one end of the capacitor $C_1$. The collector output of a transistor $Q_3$ is fed to the other end, that is, the charge/discharge terminal of the capacitor $C_1$ through a resistor $R_1$ and a diode $D_5$ connected to each other in series, and through a resistor $R_8$ connected in parallel with a series connected resistor $R_7$ and diode $D_5$. A positive electric source is supplied to the emitter of the transistor $Q_3$. The negative-polarity error cut command signal g from the system controller 40 is fed to the base of the transistor $Q_3$. A negative electric source is supplied to the collector of the transistor $Q_3$ through a resistor $R_9$.

As shown FIG. 3(A), when error components FWD corresponding to the forward driving force of the spindle motor 1 and error components REV ending to the reverse driving force of the same are alternately fed to the operational amplifier 68 in the above-mentioned spindle servo circuit 27, a driving signal DR having its level corresponding to the absolute value of each error component, as shown in FIG. 3(B), is output from the operational amplifier 70 in the case where the FET switch 69 is on. However, when the negative-polarity error cut command signal q is fed to the base of the transistor $Q_3$, part of the driving signal DR output from the operational amplifier 70 corresponding to the reverse-direction driving force is reduced as shown in FIG. 3(C). When the time corresponding to the time constant determined by the capacitor $C_1$ and the resistors $R_8$ and $R_9$ has passed after generation of the negative-error cut command g, the part of the driving signal DR produced from the operational amplifier 70 corresponding to the reverse driving force almost disappears as shown in FIG. 3(D).

FIG. 4 is a diagram showing a specific example of the VCO 25. In the drawing, the error signal from the spindle servo circuit 27 is fed to a voltage-to-current converting circuit 80. An electric current corresponding to the level of the error signal is produced from the voltage-current converting circuit 80 and fed to a capacitor $C_2$. The charge voltage of the capacitor $C_2$ increases with the slope corresponding to the output current of the voltage-to-current converting circuit 80 and the capacitance of the capacitor $C_2$. The charge voltage of the capacitor $C_2$ is supplied to a voltage comparison circuit 81 and to wave-shaping circuit 82. The voltage comparison circuit 81 compares the charge voltage of the capacitor $C_2$ with the reference voltage $V_r$ so that, for example, the output changes to its high level when the charge voltage of the capacitor $C_2$ is larger than the reference voltage $V_r$. The output of the voltage comparison circuit 81 is fed to the control input terminal of a switch 83. The switch 83 is arranged to turn on when the control input turns to its high level so that the electric charge of the capacitor $C_2$ can be discharged. Accordingly, a rectangular-wave signal having its frequency corresponding to the output current of the voltage-current converting circuit 80 and the capacitance of the capacitor $C_2$ is fed to the wave-shaping circuit 82. As a result, a clock signal having its frequency corresponding to the output current of the voltage-to-current converting circuit 80 and to the capacitance of the capacitor $C_2$ can be generated.

A switch 84 and a capacitor $C_3$ are connected in series between the charge/discharge terminal of the capacitor $C_2$ and ground. The changeable-range enlarging command signal e from the system controller 40 is fed to the control input terminal of the switch 84. The switching circuit 84 is arranged to turn on in response to the changeable-range enlarging command signal e. Accordingly when the changeable-range enlarging command signal is issued, the output current of the voltage-current converting circuit 80 is supplied to the capacitors $C_2$ and $C_3$ to thereby reduce the increasing rate (increase the time constant) of the charge voltage applied to the voltage comparison circuit 81. As the result, the frequency of the rectangular-wave signal fed to the wave-shaping circuit 82 is reduced so that the central frequency of the thus generated clock signal is reduced.

The operation of the processor in the above-mentioned system controller 40 will be described in detail with reference to the flowchart of FIG. 5.

When a scanning command is issued by the key operation of the operation key 48 during the execution of the main routine or the like, the operation of the processor is shifted to step S1 to judge whether or not the vertical synchronizing signal v is being put out from the separating circuit 26. If the judgment in step S1 proves that the vertical synchronizing signal v is not being output, the processor repeats the execution of step S1. Only when the judgement in step S1 proves that the vertical synchronizing signal y is being output, the operation of the processor is shifted to step S2. In step S2 the processor interrupts the sending of the write-enable signal to prevent the writing of the video signal in the RAM 33 and, at the same time, the processor changes over control of the changeover switch 30 to selectively feed the video signal read out of the RAM 33 to the output terminal 42.

Next, the operation of the processor is shifted to step S3 to start sending the forced-feed command signal b to the slider servo circuit 6. Next operation of the processor is shifted to step S4 to open the tracking servo loop for 10 msec and to start sending the changeable-range enlarging command to the VCO 25. Next, the operation of the processor is shifted to step S5 to stop sending the negative-polarity error cut command g to the spindle servo circuit 27. Next, the operation of the processor is shifted to step S6 to set the operation time of the programmable timer within the system controller 40 to 5 msec and to start the operation of the programmable timer. Next, the operation of the processor is shifted to step S7 to repeatedly test whether or not the operation of the 5 msec timer is finished. Only when the operation of the 5 msec timer is finished, the operation of the processor is shifted to step S8.

In step S8, the processor judges whether or not the vertical synchronizing signal is being output from the separating circuit 26. If the judgement in step S8 proves that the vertical synchronizing signal y is not, being output, the processor repeats the procedure of step S8. Only when the test in step S8 proves that the vertical synchronizing signal v is being output, the operation of the processor is shifted to step S9.

In step S9. the processor starts sending the write-enable signal Next, the operation of the processor is shifted to step S10 to judge whether or not the vertical synchronizing signal v is being output from the separating circuit 26. If the test in step S10 proves that the vertical synchronizing signal v is not being output, the processor repeats the procedure of step S10. Only when the judgement in step S10 provides that the vertical synchronizing signal is being output, the operation of the processor is shifted to step S11. In step S11, the processor stops sending the write-enable signal and the operation of the processor is shifted to step S12. In step S12, the processor tests whether or not the scanning command is being continuously issued. If the test in step S12 proves that the scanning command is being issued, the operation of the processor is shifted to step S13 to open the tracking servo loop for 10 msec and then the operation of the processor is shift back to step S6.

If the test in step S12 proves that the scanning command is not being issued the operation of the processor is shifted to step S14 to stop sending the forced-feed command signal b to the slider servo circuit 6. Next, the operation of the processor is shifted to step S15 to open the tracking servo loop for 10 msec and, at the same time, to stop sending the range enlarging command e to the VCO 25 for this 10 msec. Next, the operation of the processor is shifted to step S16 to control the various parts so that the video signal recorded on the disk 2 can be reproduced and fed to the video output terminal 42 and the audio output terminals 16 and 17. Next, the operation of the processor is shifted to step S17 to start sending the negative-polarity error cut command g, then returns to the execution of the routine was being executed just before the operation of the processor was shifted to step S1.

Figures 6A, 6B, 6C, 6D, 6E, 6F:
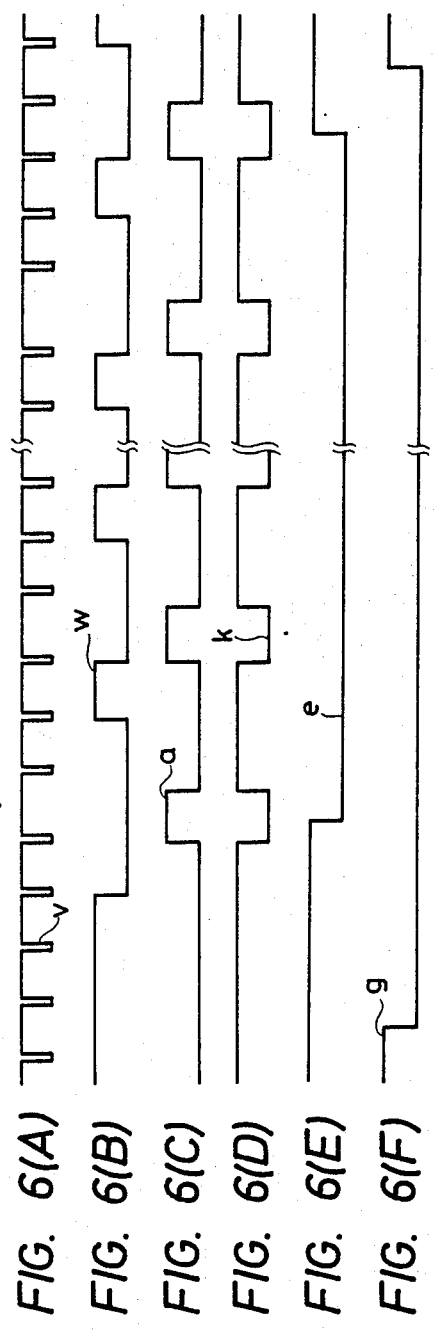
FIGS. 6(A) through 6(F) are a waveform diagram showing the signal waveforms in the various parts of the apparatus of FIG. 1.

The action according to the aforementioned operation will be described with reference to the waveform diagrams of FIGS. 6(A) through 6(F). Trace (A) of FIG. 6(A) is a waveform diagram of the vertical synchronizing signal v produced from the separating circuit 26; FIG. 6(B) is a waveform diagram of the write-enable signal w; FIG. 6(C) is a waveform diagram of the tracking open command signal a; FIG. 6(D) is a waveform diagram of the time base servo open command signal k; FIG. 6(E) is a waveform diagram of the changeable-range enlarging command signal e; and FIG. 6(F) is a waveform diagram of the negative-polarity error cut command signal g.

When the scanning command is issued, sending of the write-enable signal w is stopped synchronously with the generation of the vertical synchronizing signal v so that rewriting of the contents stored in the RAM 33 is stopped. Thereafter, sending of the forced-feed command signal b is started so that the slider 9 is forced to be operative. After the sending of the forced-feed command signal b is started the tracking open command signal a is produced for 10 msec so that the quantity of deviation of the tracking actuator within the pickup 3 increases according to the forced movement of the slider 9. When the tracking servo loop is opened according to the tracking open command signal a, the tracking actuator returns to the middle point of the movable range to make the quantity of deviation zero so that the light spot for detecting information makes a jump motion over the track of the disk 2.

When the tracking open command signal is produced, the time base servo open command signal k is produced from the D-type flip-flop circuit 63 in synchronism with the horizontal synchronizing signal h so that the reference signal $f_r$ is not fed to the counter 61 and so that the counter 61 holds the count value as it is. Accordingly also the reference synchronizing signal is not fed from the counter 61 to the phase comparison circuit 62 so that the output of the phase comparison circuit 62 tends to reduce the rotation of the spindle motor 1. However, the time constant circuit of the equalizer 64 is discharged by the switch 67 so that the output, after passing through the equalizer 64, is substantially equivalent to that in the case where the time base error is zero. As a result, the spindle motor 1 and the CCD 24 operate in the same manner as in the case where the error signal is zero.

While the time base servo loop open command signal k, is being output, sending of the changeable-range enlarging command signal is started to turn on the switch 4 in the VCO 25. Accordingly, the output current of the voltage-to-current converting circuit 80 is fed to both the capacitors $C_1$ and $C_2$ so that the rate of increase of the charge voltage applied to the voltage comparison circuit 81 is reduced. As a result, the central frequency of the clock from the wave-shaping circuit 82 is reduced. However the reduction of the central frequency of the clock has no influence on the time base control because it occurs when the time base control is stopped according to the time base servo loop open command signal k.

When the time base servo loop open command signal k which has been being produced from the D-type flip-flop 63 disappears owing to the disappearance of the tracking open command signal the reference signal $f_r$ begins to be fed to the counter 61. The time required for the jump-over operation is relatively short so that the spindle motor 1 having a relatively large inertia cannot respond rapidly during that time. Accordingly, in general, the speed just after jumping is almost unchanged compared with the speed just before jumping. Accordingly, by holding the phase of the horizontal synchronizing signal h just before jumping as a counter value and by re-operating the counter synchronously with the horizontal synchronizing signal h just after jumping phase comparison can be started by instantaneously adjusting the reference synchronizing signal and the horizontal synchronizing signal h to the same phase as that just before jumping. Further, by absorbing into the CCD a slight error in rotational speed between before and after jumping, and by absorbing the DC components of the error signal into the spindle motor, the continuity of the time base error can be maintained.

When the scanning command is generated, sending the negative-polarity error cut command signal composed of a high-level signal is stopped by step S5. Accordingly, in the spindle servo circuit 27, the transistor $Q_3$ is turned on so that accumulation of electric charge in the capacitor $C_1$ is started. Accordingly, the voltage applied to the gate of the FET switch 69 gradually increases with the time constant determined by the capacitor $C_1$ and the resistors $R_7$ and $R_8$ to thereby be equalized to the voltage of the source. As the result, the FET switch 69 gradually turns on. Accordingly, even in the case where the level of the time base error signal from the phase comparison circuit 62 becomes negative, the signal corresponding to the absolute value of the time base error signal is produced from the operational amplifier 70 to thereby start driving control for the spindle motor corresponding to the positive-polarity and negative-polarity error signals.

The time base error is instantaneously increased by the start of application of the negative-polarity error signal, but the application of the negative-polarity error signal is so gradual that the increase of the time base error can be suppressed. At the same time, because the central frequency of the VCO is lowered, the signal delay time due to the CCD 24 is prolonged to thereby widen the controllable range for the time base control. When the time base servo loop open command signal k from the D-type flip-flop circuit 63 disappears owing to the disappearance of the tracking open command signal a and the switch 67 is opened, the CCD 24 restarts the fine-tuning operation from the center point of its operation so that the time base error can be prevented from coming out of the controllable range of the CCD.

With the passage of 5 msec, which is longer than the time required for locking-in of the tracking servo after the tracking servo loop is closed due to the disappearance of the tracking open command signal a, detection of the vertical synchronizing signal v is started in step S8. When the vertical synchronizing signal v is detected in step S8, the write-enable signal w is sent out during the period from the disappearance of the vertical synchronizing signal v to the generation of the next vertical synchronizing signal v so that one-field of the video signal is written in the RAM 33. Thus, rewriting of the storage contents of the RAM 33 is performed.

When sending the write-enable signal w is stopped and rewriting of the one-field video signal is finished, the tracking open command signal a is output again to start the track jump-over operation of the information-detection light spot.

When the test in step S12 proves that the scanning command is not being issued, the tracking open command signal a is continuously output for 10 msec after the sending of the force-feed command signal b is stopped to thereby perform jump-over operation. On the other hand, the sending of the changeable-range enlarging command signal is stopped in the time when the tracking servo loop is open so that the switch 84 in the VCO 25 is turned off and, consequently, the central frequency of the clock from the VCO 25 returns to its original frequency.

When the tracking open command signal a appears the sending of the negative-polarity error cut signal g is stopped in step S17 so that the transistor $Q_3$ in the spindle servo circuit 27 is turned on. Accordingly, the electric charge accumulated in the capacitor $C_1$ is discharged so that the voltage applied to the gate of the FET switch 69 is gradually reduced with the time constant determined by the capacitor $C_1$ and the resistors $R_8$ and $R_9$. As a result, the FET switch 69 is gradually turned off. Accordingly, when the level of the time base error signal from the phase comparison circuit 62 becomes negative, the signal corresponding to the absolute value of the time base error signal is not output from the operational amplifier 68 so that driving control of the spindle motor only by the positive-polarity error signal is started.

Although the above-mentioned embodiment has shown the case where the changeable range of the CCD 24 is instantaneously changed in the period where the time base servo loop command signal k issued at the time of jump-over operation just after the start of scan operation is present, the changeable-range of the CCD 24 may be changed in a different period if the changeable range of the CCD 24 is gradually changed.

As described above in detail, the time base error control system according to the present invention is characterized in that when the signal recording/reproducing means performs jump control in which control for making the detection point trace a track formed on the recording medium and control for making the detection point jump over the track are alternately repeated a controllable range of means performing the fine tuning is widened and the supply of components of the error signal under a predetermined level to means performing the rough tuning is gradually started so that the rough tuning is carried out by all the components of the error signal. Accordingly, the loop gain of the spindle servo for controlling the revolution speed of the spindle motor is gradually changed at the start of scanning or searching so that instantaneous disorder in revolution speed of the spindle motor can be reduced. Further, the controllable range of the CCD for performing fine tuning, that is, the changeable range of the signal delay time is widened, so that the time base error never exceeds the controllable range of the CCD. Consequently, the occurrence of chromatic disorder and the like can be prevented and, at the same time, heat production and electric power consumption can be reduced.

What is claimed is:

1. A time base control system for a rotating recording medium, comprising:
   means for rotating a recording medium;
   accessing means for accessing recording tracks on said rotating recording medium and having a detection point on said recording medium, said accessing means providing a detection signal corresponding to a relative speed between said detection point and a circumferential position of said rotating recording medium;
   a source of a reference signal;
   means for generating an error signal in accordance with a comparison between said reference signal and said detection signal, said error signal having first components with a first characteristic and second components with a second characteristic, different from said first characteristic;
   means for jumping said detection point radially across tracks of said rotating recording medium;
   tracking means for causing said accessing means to follow a selected one of said tracks of said rotating recording medium;
   time base correction means for correcting, in accordance with said error signal and said reference signal, a time base according to which said rotating means rotates said recording medium;
   coarse tuning means responsive to said error signal for correcting said time base, said coarse tuning means including a first servo loop passing through said rotating means;
   fine tuning means responsive to said error signal for correcting said time base, said fine tuning means including a second servo loop not passing through said rotating means, said fine tuning means being capable of controlling said time base over a variable range thereof; and
   control means operative during said jumping mode for alternately operating said tracking means and said jumping means, said control means widening said variable range of said fine tuning means and gradually increasing a supply of said second components of said error signal under a predetermined level to said coarse tuning means, whereby rough tuning of said time base is performed according to both said first and said second components of said error signal.

2. A time base control system according to claim 1, wherein said fine tuning means comprises a variable delay element having a signal delay time changeable in accordance with said error signal and wherein said variable range of said fine tuning means is provided by a variable range of said signal delay time.

3. A time base control system according to claim 1, wherein said control means includes means for returning, upon terminating operating said jumping means, said widened variable range to an initial range and stopping said supply of said second components of said error signal under said predetermined level whereby said rough tuning of said time base is performed by said first components of said error signal over said predetermined level.

4. A time base control system according to claim 3, wherein upon said terminating, said returning means gradually supplies said second components of said error signal under said predetermined level.

5. A time base control system according to claim 1, wherein said coarse tuning means includes means for rectifying said error signal relative to said predetermined level.

6. A time base control system according to claim 1, wherein said rotating means includes a spindle motor rotating said recording medium and operating in response to said time base.

* * * * *